(12) United States Patent
Kurapati et al.

(10) Patent No.: US 7,035,863 B2
(45) Date of Patent: Apr. 25, 2006

(54) METHOD, SYSTEM AND PROGRAM PRODUCT FOR POPULATING A USER PROFILE BASED ON EXISTING USER PROFILES

(75) Inventors: Kaushal Kurapati, Yorktown Heights, NY (US); Srinivas Gutta, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 421 days.

(21) Appl. No.: 10/175,193

(22) Filed: Jun. 19, 2002

(65) Prior Publication Data

US 2003/0236770 A1 Dec. 25, 2003

Related U.S. Application Data

(63) Continuation-in-part of application No. 10/014,195, filed on Nov. 13, 2001.

(51) Int. Cl.
*G06F 7/00* (2006.01)
(52) U.S. Cl. ............... 707/101; 707/100; 707/104.1
(58) Field of Classification Search ......... 707/1–104.1; 705/26
See application file for complete search history.

(56) References Cited

U.S. PATENT DOCUMENTS

| | | | | |
|---|---|---|---|---|
| 5,754,939 A | | 5/1998 | Herz et al. ............... 455/3.04 |
| 6,012,058 A | | 1/2000 | Fayyad et al. ............... 707/6 |
| 6,092,049 A | * | 7/2000 | Chislenko et al. ............ 705/10 |
| 6,115,708 A | | 9/2000 | Fayyad et al. ............... 707/6 |
| 6,167,390 A | * | 12/2000 | Brady et al. .................. 706/20 |
| 6,460,036 B1 | * | 10/2002 | Herz ........................... 707/10 |
| 6,571,279 B1 | * | 5/2003 | Herz et al. ................. 709/217 |
| 6,640,229 B1 | * | 10/2003 | Gilmour et al. .............. 707/9 |
| 6,775,664 B1 | * | 8/2004 | Lang et al. .................... 707/3 |
| 2001/0013009 A1 | | 8/2001 | Greening et al. ............ 16/17 |
| 2002/0038230 A1 | * | 3/2002 | Chen ........................... 705/7 |
| 2002/0072974 A1 | * | 6/2002 | Pugliese et al. ............ 705/14 |
| 2002/0129368 A1 | * | 9/2002 | Schlack et al. .............. 725/46 |
| 2002/0138758 A1 | * | 9/2002 | Cason et al. ............... 713/201 |
| 2004/0010591 A1 | * | 1/2004 | Sinn et al. .................. 709/225 |

FOREIGN PATENT DOCUMENTS

WO WO 02/2593842 3/2002

OTHER PUBLICATIONS www.qhull.org/html/qvoronoi.htm "qvoronoi—Voronoi diagram", The Geometry Center, Minneapolis MN, Sep. 25, 1995, pp. 1-14.

* cited by examiner

*Primary Examiner*—Luke S Wassum
*Assistant Examiner*—Linh Black
(74) *Attorney, Agent, or Firm*—Michael E. Belk

(57) ABSTRACT

A method, system and program product for populating a user profile based on existing user profiles is provided. Specifically, under the present invention, base characteristics are designated for a new user profile. Based on the designated characteristics, the new user profile is associated with a particular Vornoi cluster region of existing user profiles. Once associated, the new user profile is populated with defined characteristics from the existing user profiles within the particular cluster region. After population, viewing recommendations can be made.

22 Claims, 5 Drawing Sheets

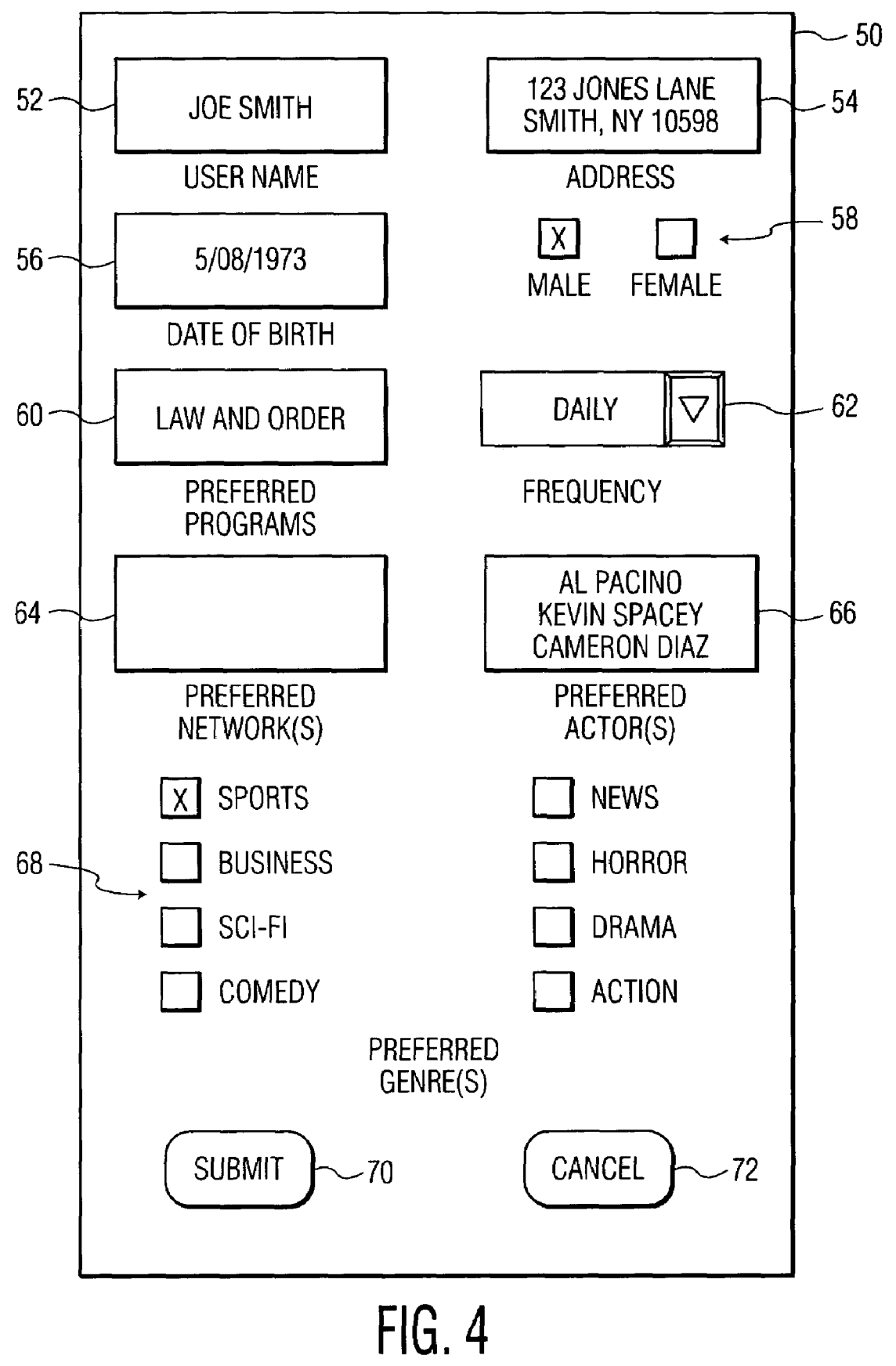

| | |
|---|---|
| USER NAME: JOE SMITH | ADDRESS: 123 JONES LANE SMITH, NY 10598 |
| DATE OF BIRTH: 5/08/1973 | [X] MALE   [ ] FEMALE |
| PREFERRED PROGRAMS: LAW AND ORDER | FREQUENCY: DAILY ▼ |
| PREFERRED NETWORK(S): | PREFERRED ACTOR(S): AL PACINO, KEVIN SPACEY, CAMERON DIAZ |

PREFERRED GENRE(S):

- [X] SPORTS
- [ ] BUSINESS
- [ ] SCI-FI
- [ ] COMEDY
- [ ] NEWS
- [ ] HORROR
- [ ] DRAMA
- [ ] ACTION

[SUBMIT]   [CANCEL]

FIG. 4

```
NAME - JOE SMITH                              ~ 80

ADDRESS - 123 JONES LANE, SMITH, NY 10598

DATE OF BIRTH - MAY 8, 1973

SEX - MALE

PREFERRED PROGRAM(S) - LAW AND ORDER;

PREFERRED ACTOR(S) - AL PACINO; KEVIN SPACEY;
AND CAMERON DIAZ

PREFERRED NETWORK (S) -

PREFERRED GENRE(S) - SPORTS
```

FIG. 5

```
NAME - JOE SMITH                              ~ 82

ADDRESS - 123 JONES LANE, SMITH, NY 10598

DATE OF BIRTH - MAY 8, 1973

SEX - MALE

PREFERRED PROGRAM(S) - LAW AND ORDER; CSI;
AND SPORTSCENTER

PREFERRED ACTOR(S) - AL PACINO; KEVIN SPACEY;
AND CAMERON DIAZ

PREFERRED NETWORK(S) - ESPN; NBC; AND HBO

PREFERRED GENRE(S) - SPORTS; COMEDY; AND
DRAMA
```

FIG. 6

METHOD, SYSTEM AND PROGRAM PRODUCT FOR POPULATING A USER PROFILE BASED ON EXISTING USER PROFILES

The present application is a continuation-in-part of U.S. patent application Ser. No. 10/014,195 filed Nov. 13, 2001.

BACKGROUND OF THE INVENTION

1. Technical Field

In general, the present invention relates to a method, system and program product for populating a user profile based on existing user profiles. In particular, the present invention populates a new user profile based on existing user profiles grouped into Vornoi cluster regions.

2. Background Art

As television and similar programming becomes more popular, the functionality of consumer electronic devices increases. For example, many consumers currently possess a set-top box or the like for receiving cable or satellite television signals. Moreover, devices such as hard-disk recorders (e.g., TIVO) have provided consumers with functionality never before thought possible. In providing more advanced features, much emphasis is placed on the personal preferences of the individual consumer/user. To this extent, many devices allow a user to establish/update a user profile, which can be used enhance to functionality of the device. For example, the user could provide information such as programs they prefer, networks they frequently watch, etc. This information can be used by program networks and other organizations (e.g., Nielsen) in determining future programming.

Heretofore, user profile development went little further than individual users providing information. Specifically, there is currently no mechanism for populating or enhancing a user profile based on existing user profiles. For example, if user "A" indicates that he/she prefers the crime drama genre of programs, no current mechanism exists for adopting specific crime drama programs from similar user profiles. Part of the problem in providing such functionality has been the lack of efficient means for comparing and populating user profiles. In particular, at any one time, an inordinate quantity of unorganized user profiles could exist. To compare a new user profile to such existing profiles is both time consuming and impractical.

In view of the foregoing, there exists a need for a method, system and program product for populating a new user profile based on existing user profiles. A further need exists for the existing user profiles to be grouped into Vornoi cluster regions based on the characteristics thereof. Still yet a need exists for the new user profile to be associated with a particular cluster region so that characteristics of the existing user profiles therein can be used to populate the new user profile. Another need exists for recommendations to be made based on a populated new user profile.

SUMMARY OF THE INVENTION

In general, the present invention provides a method, system and program product for populating a user profile based on existing user profiles. Specifically, under the present invention, base characteristics are designated for a new user profile. Based on the designated characteristics, the new user profile is associated with a particular Vornoi cluster region of existing user profiles. Once associated, the new user profile is populated with defined characteristics from the existing user profiles within the particular cluster region. After the new user profile is populated, recommendations based thereon can be made.

According to a first aspect of the present invention, a method for populating a user profile based on existing user profiles is provided. The method comprises: (1) designating base characteristics for a new user profile; (2) associating the new user profile with a cluster region of existing user profiles based on the base characteristics; and (3) populating the new user profile with defined characteristics from the existing user profiles.

According to a second aspect of the present invention, a method for populating a user profile based on existing user profiles is provided. The method comprises: (1) providing a plurality of existing user profiles grouped into Vornoi clusters regions; (2) designating base characteristics for a new user profile; (3) associating the new user profile with one of the Vornoi cluster regions based on the base characteristics; and (4) populating the new user profile with defined characteristics from the existing user profiles.

According to a third aspect of the present invention, a system for populating a user profile based on existing user profiles is provided. The system comprises: (1) a designation system for designating base characteristics for a new user profile; (2) an association system for associating the new user profile with a cluster region of existing user profiles based on the base characteristics; and (3) a population system for populating the new user profile with defined characteristics from the existing user profiles.

According to a fourth aspect of the present invention, a program product stored on a recordable medium for populating a user profile based on existing user profiles is provided. When executed, the program product comprises: (1) program code for designating base characteristics for a new user profile; (2) program code for associating the new user profile with a cluster region of existing user profiles based on the base characteristics; and (3) program code for populating the new user profile with defined characteristics from the existing user profiles.

Therefore, the present invention provides a method, system and program product for populating a new user profile based on existing user profiles.

BRIEF DESCRIPTION OF THE DRAWINGS

These and other features of this invention will be more readily understood from the following detailed description of the various aspects of the invention taken in conjunction with the accompanying drawings in which:

FIG. 4 depicts an exemplary interface for designating base characteristics for a new user profile.

FIG. 5 depicts an exemplary new user profile.

FIG. 6 depicts an exemplary new user profile after being populated based on existing user profiles.

Figure 1:
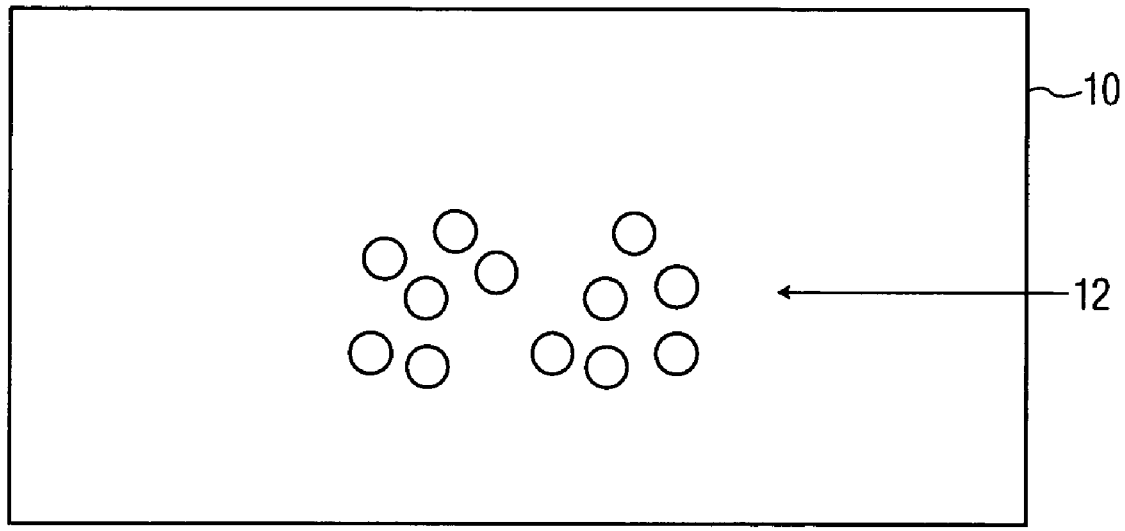
FIG. 1 depicts a set of points in a plane.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a method, system and program product for populating a new user profile based on existing user profiles grouped into Vornoi cluster regions. In a typical embodiment, the present invention is useful in populating new user profiles for, among other things, consumer electronic devices such as hard-disk recorders, set-top boxes, DVD players, etc. In general, a user profile for a consumer electronic device includes characteristics/information that are useful in determining the viewing preferences of a user. Such as characteristics can include, among other things: (1) personal information (e.g., name, age, etc.); (2) program preferences; (3) actor preferences; (4) network preferences; and (5) genre preferences. Under the present invention, a new user profile will be associated with a Vornoi cluster region of existing user profiles. Once associated, defined characteristics from the existing profiles within the associated region can be used to (further) populate the new user profile. Based on the population, viewing recommendations can be made to the user. For example, if a user indicates that he/she likes a particular genre of program, certain programs could be recommended. To this extent, the present invention populates a user profile and makes viewing recommendations based on existing user profiles exhibiting similar viewing preferences.

Figure 2:
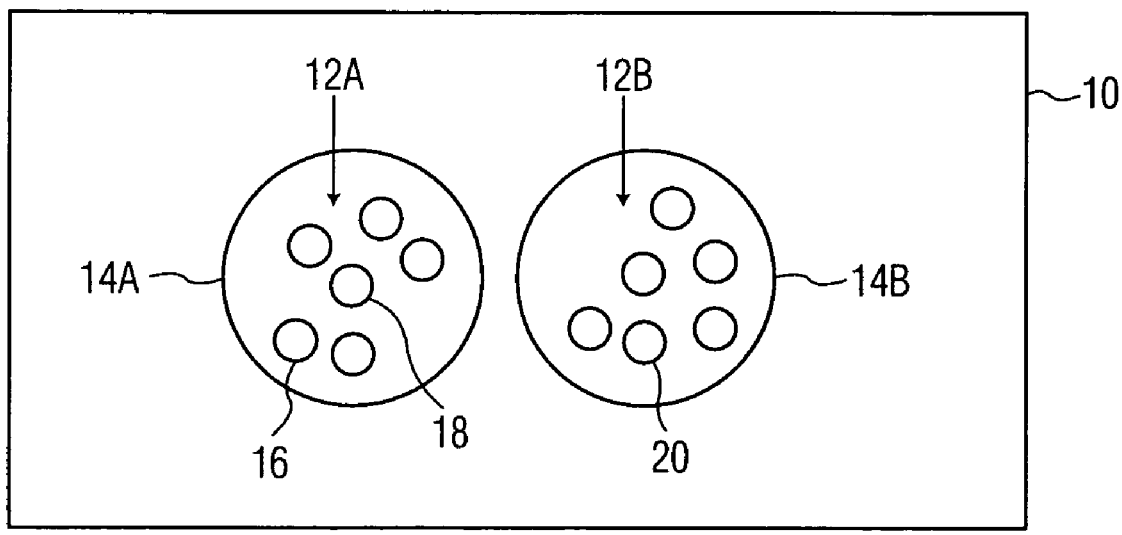
FIG. 2 depicts set of points of FIG. 1 grouped into Vornoi cluster regions.

Referring now to FIG. 1, plane 10 having set of points 12 is shown. As depicted, points 12 are not grouped or arranged into cluster regions. Rather, the points exist as random, unaffiliated points. For the purposes of the present invention, each point 12 could represent a separate existing user profile. The same points are shown in FIG. 2 after having been grouped into cluster regions 14A–B. As shown, points 12A reside in cluster region 14A while points 12B reside in cluster region 14B. Cluster regions 14A–B are typically Vornoi cluster regions because each point in a particular cluster region is closer in proximity to other points within the same cluster region than to any point in another cluster region. For example, point 16 is closer in proximity to point 18 in cluster region 14A than it is to point 20 in cluster region 14B. To this extent, Vornoi cluster regions are well known in the art and many software programs exist for computing Vornoi diagrams. One such example is the software program QHULL, which is discussed in detail at world wide website "www.geom.umn.edu/software/qhull/html/qvoronoi.htm."

Under the present invention, a set of existing user profiles is grouped into one or more Vornoi cluster regions based on the characteristics thereof. For example, user profiles indicating a preference for sports viewing could be grouped into one cluster region, while user profiles indicating a preference for drama could be grouped into a different cluster region. Once grouped into appropriate cluster regions, the characteristics therefrom can be used to populate other or new user profiles.

In a typical embodiment, a new user will initially create a new user profile by designating base characteristics. Once created, the new user profile can be associated with an appropriate cluster region based on the designated characteristics. For example, if the user indicated a strong liking towards the sports genre of programming, his/her user profile could be associated with the sports cluster region. In any event, once associated, the new user profile can be further populated with defined characteristics from the existing user profiles in the associated cluster region. For example, if existing user profiles in the sports cluster region indicated a preference for the program SPORTSCENTER, which the user did not specifically reference in his/her new user profile, this program could be added to the user's profile. Once populated, recommendations could be made to the user based on the populated user profile. For example, the user could be issued a recommendation to tune to the ESPN network at 6:00 PM nightly to watch and/or record SPORTSCENTER.

In making recommendations, any known recommendation algorithm could be implemented. For example, one algorithm could make recommendations based on a designated frequency. That is, if the user indicated that he/she watches sports programming nightly, the recommendation for SPORTSCENTER could be strong. To this extent, recommendations could be accompanied with a strength rating (e.g., on a scale of 1 to 5). Alternatively, the strength of the recommendation could be based on the recommended viewing frequency (e.g., recommend the user to watch SPORTSCENTER nightly, weekly, etc.) Additional exemplary recommendation algorithms that could be implemented hereunder are described in International Publication No. WO 02/25938 A2, entitled "Method and Apparatus for Generating Recommendation Scores Using Implicit and Explicit Viewing Preferences," herein incorporated by reference.

Figure 3:
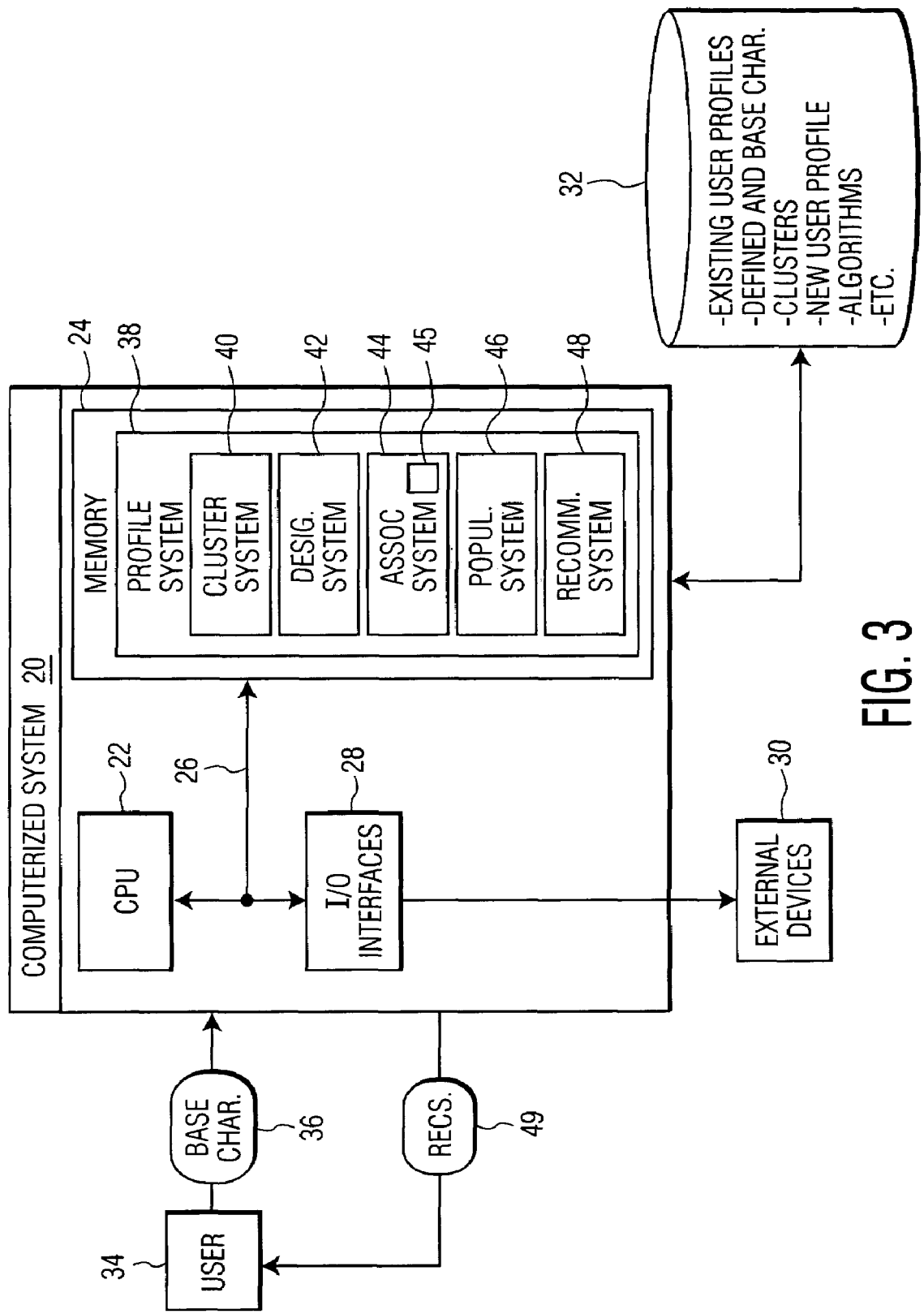
FIG. 3 depicts a computerized system having a profile system.

Referring now to FIG. 3, a computerized implementation of the present invention is shown. Specifically, computerized system 20 is shown. As used herein, computerized system 20 is intended to be representative of any consumer electronic device (e.g., set-top box, hard-disk recorder, DVD player, etc.) capable of storing information and executing commands. As depicted, computerized system 20 generally comprises central processing unit (CPU) 22, memory 24, bus 26, input/output (I/O) interfaces 28, external devices/resources 30 and database 32. CPU 22 may comprise a single processing unit, or be distributed across one or more processing units in one or more locations, e.g., on a client and server. Memory 24 may comprise any known type of data storage and/or transmission media, including magnetic media, optical media, random access memory (RAM), read-only memory (ROM), a data cache, a data object, etc. Moreover, similar to CPU 22, memory 24 may reside at a single physical location, comprising one or more types of data storage, or be distributed across a plurality of physical systems in various forms.

I/O interfaces 28 may comprise any system for exchanging information to/from an external source. External devices/resources 30 may comprise any known type of external device, including speakers, a CRT, LED screen, hand-held device, keyboard, mouse, voice recognition system, speech output system, printer, monitor, facsimile, pager, etc. Bus 26 provides a communication link between each of the components in computerized system 20 and likewise may comprise any known type of transmission link, including electrical, optical, wireless, etc. In addition, although not shown, additional components, such as cache memory, communication systems, system software, etc., may be incorporated into computerized system 20.

Database 32 may provide storage for information necessary to carry out the present invention. Such information could include, among other things, existing user profiles, defined characteristic for existing user profiles, designated base characteristics (Vornoi) cluster regions, new user profiles, algorithms, etc. As such, database 32 may include one or more storage devices, such as a magnetic disk drive or an optical disk drive. In another embodiment, database 32 includes data distributed across, for example, a local area network (LAN), wide area network (WAN) or a storage area network (SAN) (not shown). Database 32 may also be configured in such a way that one of ordinary skill in the art may interpret it to include one or more storage devices.

Stored in memory 24 of computerized system 20 is profile system 38 (shown as a program product). In general, profile system 38 includes cluster system 40, designation system 42, association system 44, population system 46 and recommendation system 48. As indicated above, existing user profiles are grouped into Vornoi cluster regions. In one embodiment, third parties such as NIELSEN provide existing user profiles. Alternatively, the existing user profiles can be those of other users who have purchased a similar consumer device and completed a user profile. In any event, computerized system 20 could be packaged with existing user profiles already stored in database 32, or the existing user profiles could be periodically downloaded/transmitted from a source (not shown).

In any event, if the existing user profiles are not already grouped into cluster regions, cluster system 40 will perform the grouping according to any known algorithm. As indicated above, existing user profiles could be grouped based on genres (e.g., sports, drama, etc.). However, it should be understood that any variation could be implemented. For example, the existing user profiles could be grouped into cluster regions based on particular programming (e.g., all profiles indicating program "X" are grouped into one cluster region). To this extent, cluster system 38 could comprise any known software program (e.g., QHULL) for forming the Vornoi cluster regions under the present invention.

Once existing user profiles have been grouped into cluster regions, new user profiles can be populated. In general, user 34 will designate base characteristics of his/her new user profile via designation system. To this extent, designation system 42 typically includes a user interface. Referring now to FIG. 4. an exemplary user interface 50 is shown in detail. As depicted, user interface 50 includes fields/windows, menus and buttons for designating base characteristics. Base characteristics can be any details/information such as personal information and/or programming preferences that would be helpful in determining the viewing preferences of user 34. For example, user interface 50 could include name window 52 for user 34 to designate his/her name, address window 54 for designating an address, date window 56 for designating a date of birth, and gender boxes 58 for designating gender. Moreover, interface 50 could also include preference windows such as program window 60 for designating any preferred programs, frequency menu 62 for designating a program viewing frequency, network window 64 for designating any preferred networks, actor window 66 for designating any preferred actors/actresses, and genre boxes 68 for designating any preferred program genres.

In designating the base characteristics via interface 50, any known method can be employed. For example, user 34 could use a remote control to input the information. Alternatively, the consumer electronic device could include controls for inputting the information. In any event, the quantity of information designated by user 34 can be left entirely up to user 34. For example, user 34 need not designate preferred networks. Once user 34 has designated any desired base characteristics, submit button 70 could be selected to store the designated characteristics as a new user profile in database 32, or cancel button 72 could be selected to clear interface 50.

It should be understood that interface 50 is intended to be exemplary only and that many variations could be implemented. Moreover, it should be understood that the characteristics that could be designated via interface 50 are not intended to be limiting. Rather, any type of information helpful in determining viewing preferences could be requested.

Referring back to FIG. 3, once the base characteristics have been designated, the new user profile will be associated with a particular cluster region of existing user profiles via association system 44. Similar to clustering existing user profiles, association can be according to any known algorithm. For example, user 34 designated sports as a preferred genre via interface 50. Thus, the new user profile could be associated with the sports cluster region. Alternatively, user 34 designated LAW AND ORDER as a preferred program, thus, the new user profile could be associated with a drama or crime drama cluster region. In any event, the association algorithm (whatever it may be) could be stored in database 32 and accessed by association system 44. In another embodiment, association system 44 could include comparison system 45 for comparing the base characteristics of the new user profile to the defined characteristics of individual existing user profiles to identify existing user profiles that are similar to the new user profile. For example, because user 34 designated sports as a preferred genre, comparison system 44 could scan the set of existing user profiles to identify existing profiles with sports-related characteristics. Once identified, the new user profile could be associated with the applicable cluster region. To this extent, it could be possible for a new user profile to be associated with more than one cluster region.

Once the new user profile has been associated with a particular cluster region(s), defined characteristics from the existing user profiles therein will be used to populate (further populate) the new user profile. Referring to FIGS. 5–6, the new user profile prior to and after population is depicted. As shown in FIG. 5, new user profile prior to population 80 comprises only the information designated via interface 50. However, new user profile after population 82 (FIG. 6) includes the additional preferred programs of CSI and SPORTSCENTER, the preferred networks of ESPN, NBS and HBO, as well as the additional preferred genres of comedy and drama. The additional characteristics were copied from existing user profiled within the associated cluster region. Specifically, because the new user profile is associated with a particular cluster region based viewing preferences (e.g., base characteristics), the existing user profiles within the particular cluster region are deemed to be similar to the new user profile. Accordingly, applicable/appropriate viewing preferences will be copied from the existing user profiles to the new user profile. For example, because user 34 designated sports as a preferred genre via interface 50, population system 46 (FIG. 3) copied the related programs of SPORTSCENTER and the network of ESPN from existing profiles to the new user profile. Moreover, because user 34 designated LAW AND ORDER as a preferred program, population system 46 copied the related program of CSI and the networks of NBC and HBO to the new user profile.

Once the new user profile has been populated with defined characteristics from existing user profiles, recommendations 49 can be made to user 34. For example, recommendation system 48 (FIG. 3) could recommend that user 34 watch CSI weekly on a particular network at a particular time. Moreover, the recommendation could be accompanied with a "strength" based on user's 10 designated base characteristics. In this case, because user 34 indicated he/she views LAW AND ORDER daily, recommendation 49 for CSI could be strong. Similar to clustering existing user profiles and associating a new user profile with a particular cluster, the recommendation algorithm can be varied and is typically stored in database 32.

Figure 7:
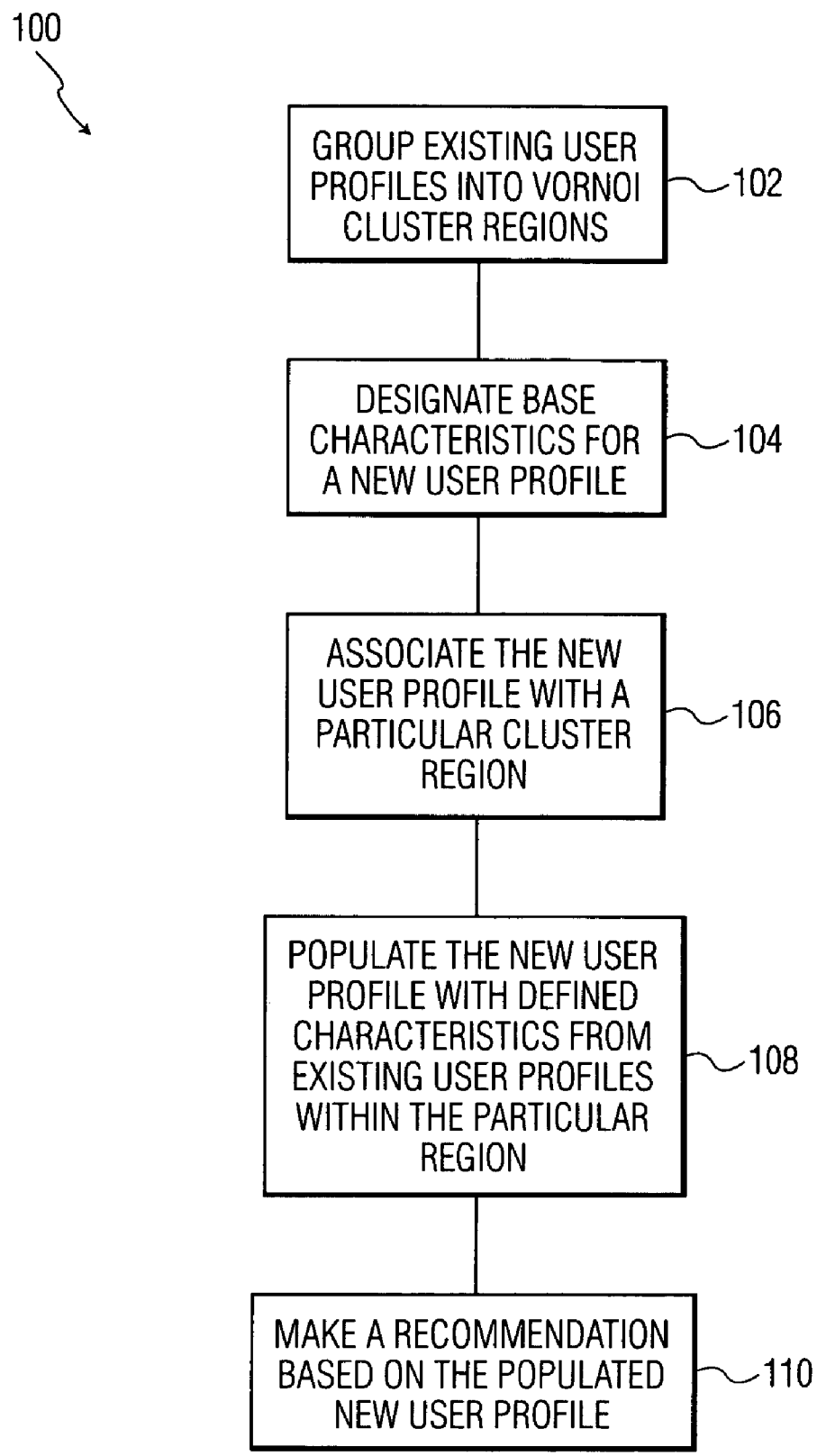
FIG. 7 depicts a method flow diagram according to the present invention.

Referring now to FIG. 7, a method flow diagram 100 according to the preen invention is shown. As depicted, first step 102 is to group existing user profiles into Vornoi cluster regions. To this extent, the existing user profiles could be provided already grouped into the cluster regions, or they could be provided un-grouped in which case cluster system 40 will perform the necessary grouping. In any event, second step 104 is to designate base characteristic for a new user profile. Once designated, third step 106 is to associate the new user profile with a particular cluster region. Fourth step 108 is then to populate the new user profile with defined characteristics from existing user profiles within the particular cluster region. Once populated, fifth step 110 is to make recommendations based on the populated new user profile.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls computerized system 20 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the art.

What is claimed is:

1. A method for populating a user profile based on existing user profiles, comprising:
    designating base characteristics for a new user profile;
    associating the new user profile with a cluster region of existing user profiles based on the base characteristics; and
    populating the new user profile with defined characteristics from the existing user profiles.

2. The method of claim 1, further comprising making a recommendation based on the populated new user profile.

3. The method of claim 1, further comprising providing a plurality of existing user profiles grouped into cluster regions, prior to the associating step.

4. The method of claim 3, wherein the cluster regions are Vornoi cluster regions in that an existing user profile in a particular cluster region is closer in proximity to other existing user profiles in the particular cluster region than it is to existing user profiles in other cluster regions.

5. The method of claim 1, wherein the associating step comprises:
    comparing the base characteristics of the new user profile to defined characteristics of existing user profiles to identify existing user profiles that are similar to the new user profile; and
    associating the new user profile with a cluster region having similar existing user profiles.

6. The method of claim 1, wherein the base characteristics and the defined characteristics comprise user preferences that are selected from the group consisting of programs, channels, actors and genres.

7. A method for populating a user profile based on existing user profiles, comprising:
    providing a plurality of existing user profiles grouped into Vornoi clusters regions;
    designating base characteristics for a new user profile;
    associating the new user profile with one of the Vornoi cluster regions based on the base characteristics; and
    populating the new user profile with defined characteristics from the existing user profiles.

8. The method of claim 7, further comprising making a recommendation based on the populated user profile.

9. The method of claim 7, wherein the associating step comprises:
    comparing the base characteristics of the new user profile to defined characteristics of existing user profiles to identify existing user profiles that are similar to the new user profile; and
    associating the new user profile with a cluster region having similar existing user profiles.

10. The method of claim 7, wherein the base characteristics and the defined characteristics comprise user preferences that are selected from the group consisting of programs, channels, actors and genres.

11. A computer implemented system for populating a user profile based on existing user profiles, comprising a memory containing:
    a designation system for designating base characteristics for a new user profile;
    an association system for associating the new user profile with a cluster region of existing user profiles based on the base characteristics; and
    a population system for populating the new user profile with defined characteristics from the existing user profiles.

12. The system of claim 11, further comprising a recommendation system for making a recommendation based on the populated new user profile.

13. The system of claim 11, further comprising a cluster system for grouping a plurality of existing user profiles into cluster regions.

14. The system of claim 13, wherein the cluster regions are Vornoi cluster regions in that an existing user profile in a particular cluster region is closer in proximity to other existing user profiles in the particular cluster region than it is to existing user profiles in other cluster regions.

15. The system of claim 11, wherein the association system comprises a comparison system for comparing the base characteristics of the new user profile to defined characteristics of existing user profiles to identify existing user profiles that are similar to the new user profile.

16. The system of claim 11, wherein the base characteristics and the defined characteristics comprise user preferences that are selected from the group consisting of programs, channels, actors and genres.

17. A program product stored on a recordable medium for populating a user profile based on existing user profiles, which when executed, comprises:
- program code for designating base characteristics for a new user profile;
- program code for associating the new user profile with a cluster region of existing user profiles based on the base characteristics; and
- program code for populating the new user profile with defined characteristics from the existing user profiles.

18. The program product of claim 17, further comprising program code for making a recommendation based on the populated new user profile.

19. The program product of claim 17, further comprising program code for grouping a plurality of existing user profiles into cluster regions.

20. The program product of claim 19, wherein the cluster regions are Voronoi regions in that an existing user profile in a particular cluster region is closer in proximity to other existing user profiles in the particular cluster region than it is to existing user profiles in other cluster regions.

21. The program product of claim 17, wherein the program code for associating comprises program code for comparing the base characteristics of the new user profile to defined characteristics of existing user profiles to identify existing user profiles that are similar to the new user profile.

22. The program product of claim 17, wherein the base characteristics and the defined characteristics comprise user preferences that are selected from the group consisting of programs, channels, actors and genres.

* * * * *